(12) United States Patent
Watanabe

(10) Patent No.: US 6,996,226 B2
(45) Date of Patent: Feb. 7, 2006

(54) COMMUNICATION SYSTEM

(75) Inventor: Kenichi Watanabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 458 days.

(21) Appl. No.: 10/392,815

(22) Filed: Mar. 21, 2003

(65) Prior Publication Data

US 2003/0215079 A1    Nov. 20, 2003

(30) Foreign Application Priority Data

Mar. 22, 2002  (JP) .............................. 2002-081774

(51) Int. Cl.
*H04M 1/00*    (2006.01)
(52) U.S. Cl. ..................... 379/355.03; 379/355.02; 379/93.01; 379/93.05
(58) Field of Classification Search ............ 379/93.01, 379/93.05, 93.06, 93.07, 93.08, 90.01, 93.25, 379/251, 352, 355.02, 335.03, 399.01
See application file for complete search history.

(56) References Cited

U.S. PATENT DOCUMENTS

| | | | |
|---|---|---|---|
| 6,738,643 B1 * | 5/2004 | Harris .................. | 455/556.1 |
| 6,871,212 B2 * | 3/2005 | Khouri et al. .......... | 379/90.01 |
| 2002/0080930 A1 * | 6/2002 | Cho ....................... | 379/90.01 |
| 2004/0205151 A1 * | 10/2004 | Sprigg et al. ........... | 379/90.01 |
| 2004/0218739 A1 * | 11/2004 | Nicol ..................... | 379/90.01 |

FOREIGN PATENT DOCUMENTS

| | | |
|---|---|---|
| JP | 10-336304 A | 12/1998 |
| JP | 11-41294 A | 2/1999 |
| JP | 2001-127902 A | 2/2001 |

* cited by examiner

*Primary Examiner*—Jefferey F. Harold
(74) *Attorney, Agent, or Firm*—Birch, Stewart, Kolasch & Birch, LLP

(57) ABSTRACT

An object of the invention is to provide a communication system that enables telephone communications to be quickly performed by a simple operation. A user activates a telephone directory application program on a PDA terminal, and the PDA terminal transmits a destination telephone number to a gateway together with a request for initiation of a call to that destination telephone number and an IP address of a NET telephone terminal that the user desires to use. When an off-hook condition of the NET telephone terminal is detected, the gateway initiates a call to the previously received telephone number and establishes a communication link to a destination NET telephone terminal accommodated in a digital public telephone network. The communication link can be established in the same manner even if the destination telephone terminal is an ordinary telephone terminal accommodated in a public telephone network.

9 Claims, 12 Drawing Sheets

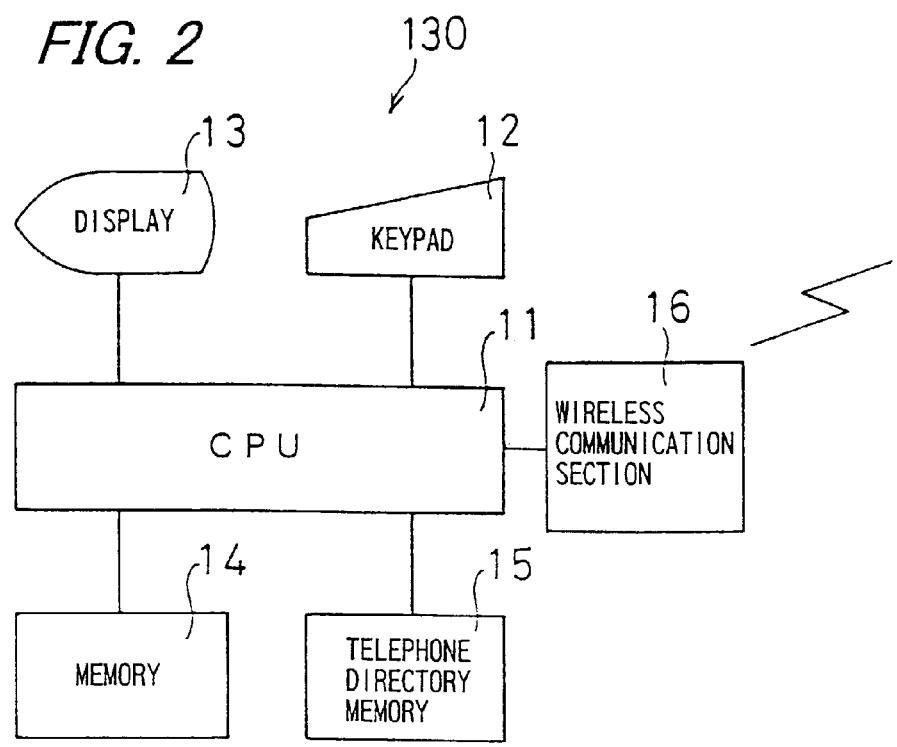
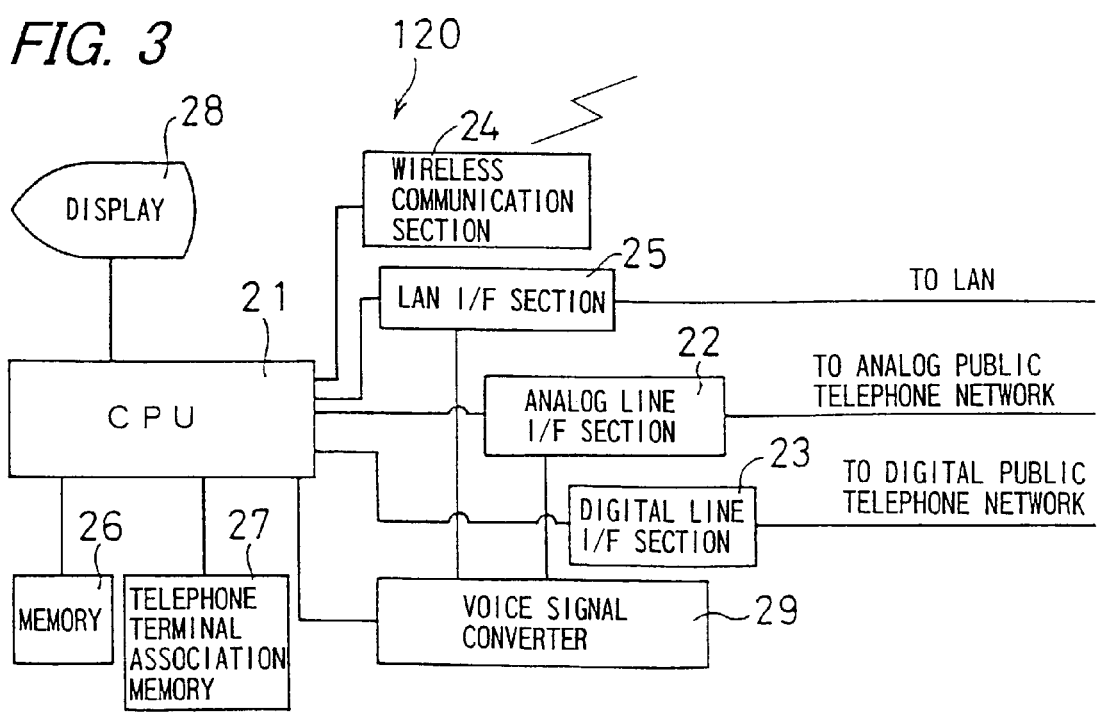

FIG. 12

|  | NET TELEPHONE TERMINAL 150 | NET TELEPHONE TERMINAL 151 | ORDINARY TELEPHONE TERMINAL 160 |
|---|---|---|---|
| PDA TERMINAL 130 | SET | - | SET |
| PDA TERMINAL 131 | SET | SET | - |
| PC 140 | SET | - | - |
| PC 141 | SET | SET | SET |

COMMUNICATION SYSTEM

BACKGROUND OF THE INVENTION

1. Field of the Invention

The invention relates to a communication system in which a telephone terminal performs telephone communications, via a communication control apparatus, with a destination telephone terminal accommodated in an external network, and more particularly to a communication system that allows a telephone call to be initiated from an information terminal accommodated in the communication system.

2. Description of the Related Art

When initiating a call from a telephone terminal connected to a public telephone network (hereinafter called an ordinary telephone terminal), the caller has to enter the telephone number of the destination telephone terminal by operating numeric keys or the dial on the telephone. The caller manually enters the telephone number by looking it up in a paper-based telephone directory or by searching through telephone numbers managed by a telephone directory application program incorporated in a portable personal information terminal such as a PDA (Personal Digital Assistant) terminal. On the other hand, with the commercial implementation of VoIP (Voice over Internet Protocol) technology that performs transmission and reception of voice data in IP packet form using a TCP/IP (Transmission Control Protocol/Internet Protocol) network, telephone terminals specifically designed for VoIP (hereinafter simply called VoIP telephone terminals) have come to be used for telephone communications. In this case also, the caller manually enters telephone numbers in the same manner as with an ordinary telephone. To manually enter a telephone number, the caller first takes the telephone off-hook thus sending an off-hook signal and, after receiving a dial tone from the exchange, enters the destination telephone number by operating numeric keys, etc. thereby sending selection signals corresponding to the entered telephone number (hereinafter, transmission of an off-hook signal, reception of a dial tone, and transmission of selection signals are collectively called the initiation of a call).

One way to initiate a call from a VoIP telephone terminal may be by using a telephone directory application program stored in the telephone; however, because of the need for smaller size and increased functionality of the telephone, the display screen of the telephone is often made small and, with many letters and numbers displayed on the limited screen area, the caller may erroneously recognize the destination telephone number when searching telephone numbers by using the telephone directory application program. Furthermore, with the small keypad of the telephone, the user may press wrong keys when manually entering the telephone number. Erroneous recognition of the telephone number or entering of wrong keys results in making a call to the wrong party.

The VoIP telephone terminal, which uses a TCP/IP network as earlier described, is often connected to a personal computer or the like in a manner that enables communication between them, and in view of this, techniques for initiating a call using a personal computer have been proposed in order to prevent wrong number dialing.

For example, according to the description given in Japanese Unexamined Patent Publication JP-A 10-336304 (1998), a personal computer detects the off-hook condition of a telephone terminal connected to it, and activates the telephone application program or telephone directory application program stored in the personal computer. This saves the user the trouble of locating the program and activating it.

According to the description given in Japanese Unexamined Patent Publication JP-A 11-41294 (1999), when the user specifies a telephone number in home page data displayed on a client terminal such as a personal computer, a WWW (World Wide Web) server on which the home page data is stored transmits necessary data, including the selected telephone number and the Internet telephone software name associated with that telephone number, to the client terminal. The client terminal that received the data activates the Internet telephone software designated by the Internet telephone software name, and establishes a voice communication link with the destination telephone terminal. In this way, while browsing the home page, the user can perform voice communications with a telephone terminal connected to the ordinary telephone network.

According to Japanese Unexamined Patent Publication JP-A 2001-127902 (2001), when the user operates the VoIP telephone terminal, an information terminal such as a personal computer automatically activates a telephone directory application program and displays the telephone directory data on the screen. When the user selects the destination telephone number from the telephone directory data, the selected telephone number is transmitted from the information terminal to the VoIP telephone terminal which then automatically initiates a call to the received telephone number. This makes it possible to initiate a call without the user having to manually enter the telephone number, and serves to enhance the ease of operation of the telephone terminal.

In the prior art described above, when initiating a call from the VoIP telephone terminal, telephone directory data has to be downloaded from an external server or data such as the destination telephone number has to be transferred from a personal computer to the VoIP telephone terminal, and this has lead to the problem that the operation is cumbersome and it takes time before the call can be actually initiated.

SUMMARY OF THE INVENTION

It is an object of the invention to provide a communication system that enables telephone communications to be quickly performed by a simple operation.

The invention provides a communication system comprising: a communication control apparatus, connected to an external network, for controlling communications with the external network; one or more telephone terminals for performing telephone communications, via the communication control apparatus, with a destination telephone terminal accommodated in the external network; and one or more information terminals for performing communications with the communication control apparatus, wherein the information terminal includes: identification information storing means for storing destination terminal identification information for identifying the destination information terminal; and transmitting means for transmitting the destination terminal identification information to the communication control apparatus, and the communication control apparatus includes: association information storing means for storing association information for associating the information terminal with the telephone terminal; receiving means for receiving the destination terminal identification information from the information terminal; and control means for performing control so as to initiate a call to the destination telephone terminal based on the received destination terminal identification information and so as to establish a telephone communication link between the telephone terminal associated with the information terminal to which the destination terminal identification information is transmitted and the destination telephone terminal.

According to the invention, the communication control apparatus controls communications with the external network, and the telephone terminal performs telephone communications, via the communication control apparatus, with the destination telephone terminal accommodated in the external network. The information terminal performs communications with the communication control apparatus.

The information terminal includes identification information storing means for storing destination terminal identification information for identifying the destination information terminal, and transmits the destination terminal identification information from the transmitting means to the communication control apparatus.

When the destination terminal identification information transmitted from the information terminal is received by the receiving means, the communication control apparatus performs control so as to initiate a call to the destination telephone terminal based on the received destination terminal identification information and so as to establish a telephone communication link between the telephone terminal associated with the information terminal to which the destination terminal identification information is transmitted and the destination telephone terminal.

Accordingly, since the user, when making a call, need only operate the information terminal, and there is no need to transfer the destination terminal identification information, such as the destination telephone number, to the telephone terminal, the call initiation can be quickly accomplished by a simple operation.

In the invention it is preferable that the communication control apparatus further includes detecting means for detecting whether the telephone terminal is in an on-hook condition or an off-hook condition, wherein when the off-hook condition of the associated telephone terminal is detected by the detecting means, the control means initiates a call to the destination telephone terminal based on the received destination terminal identification information.

According to the invention, when the off-hook condition of the associated telephone terminal is detected by the detecting means, the control means in the communication control apparatus initiates a call to the destination telephone terminal based on the received destination terminal identification information.

This avoids a situation where a user of the destination telephone terminal side will be kept waiting, since the communication control apparatus does not initiates the call until the calling telephone terminal is placed in the off-hook condition.

In the invention it is preferable that the communication control apparatus further includes ringing means for sending a ringing signal to the telephone terminal, wherein the control means initiates a call to the destination telephone terminal based on the received destination terminal identification information, while at the same time, operating the ringing means so as to send the ringing signal to the associated telephone terminal.

According to the invention, the control means in the communication control apparatus initiates the call to the destination telephone terminal based on the received destination terminal identification information, while at the same time, operating the ringing means so as to send the ringing signal to the associated telephone terminal.

As a result, the communication link can be established quickly, because the communication control apparatus promptly initiates the call to the destination telephone terminal upon receiving the destination terminal identification information.

In the invention it is preferable that the destination terminal identification information is a telephone number uniquely assigned to the destination telephone terminal, and that the information terminal further includes: telephone directory storing means for storing telephone directory information in which the telephone number is associated with a subscriber who owns the destination telephone terminal; telephone directory information displaying means for displaying the telephone directory information; and destination terminal selecting means for allowing a user to select the telephone number by referring to the displayed telephone directory information, wherein the transmitting means transmits the selected telephone number.

According to the invention, the destination terminal identification information is a telephone number uniquely assigned to the destination telephone terminal, and the information terminal stores in the telephone directory storing means the telephone directory information in which the telephone number is associated with the subscriber who owns the destination telephone terminal.

When the user selects the telephone number by using the destination terminal selecting means while viewing the telephone directory information displayed on the telephone directory information displaying means of the information terminal, the selected telephone number is transmitted to the communication control apparatus.

This facilitates the selection of the destination telephone terminal, since the user can initiate a call to the destination telephone terminal by checking the telephone number or the name of the subscriber of the destination telephone terminal.

In the invention it is preferable that: the receiving means in the communication control apparatus transmits the association information to the information terminal; the transmitting means in the information terminal receives the association information from the communication control apparatus; the information terminal includes association information displaying means for displaying the received association information, and telephone terminal selecting means for allowing a user to select the telephone terminal by referring to the received association information; and the transmitting means transmits identification information for identifying the selected telephone terminal.

According to the invention, the receiving means in the communication control apparatus transmits the association information to the information terminal, and the transmitting means in the information terminal receives the association information from the communication control apparatus. When the user selects the telephone terminal by using the telephone terminal selecting means while viewing the association information displayed on the association information displaying means of the information terminal, the identification information for identifying the selected telephone terminal is transmitted to the communication control apparatus.

Accordingly, the user can easily select the telephone terminal to be used for telephone communications with the destination telephone terminal.

In the invention it is preferable that the external network is a digital public telephone network, and the communication control apparatus includes converting means for performing communication protocol conversion between the telephone terminal and the destination telephone terminal accommodated in the digital public telephone network.

According to the invention, the external network is a digital public telephone network, and the converting means of the communication control apparatus performs communication protocol conversion between the telephone terminal and the destination telephone terminal accommodated in the digital public telephone network.

This enables the telephone terminal to perform telephone communications with the destination telephone terminal even when the communication protocols differ between them.

In the invention it is preferable that the association information storing means stores one or more pieces of association information.

In the invention it is preferable that the association information storing means stores the information by associating each information terminal with one or more telephone terminals.

According to the invention, for each information terminal, one or more telephone terminals can be registered as telephone terminals that the information terminal can use for telephone communications.

In the invention it is preferable that the telephone terminal includes digital communication means for performing telephone communications with the destination telephone terminal by using digital signals.

According to the invention, the telephone terminal can perform telephone communications with the destination telephone terminal by using digital signals.

BRIEF DESCRIPTION OF THE DRAWINGS

Other and further objects, features, and advantages of the invention will be more explicit from the following detailed description taken with reference to the drawings wherein:

FIG. 2 is a block diagram showing the configuration of a PDA terminal;

FIG. 3 is a block diagram showing the configuration of a gateway;

FIG. 12 is a diagram showing the contents stored in a telephone terminal association memory.

DETAILED DESCRIPTION OF THE PREFERRED EMBODIMENTS

Figure 1:
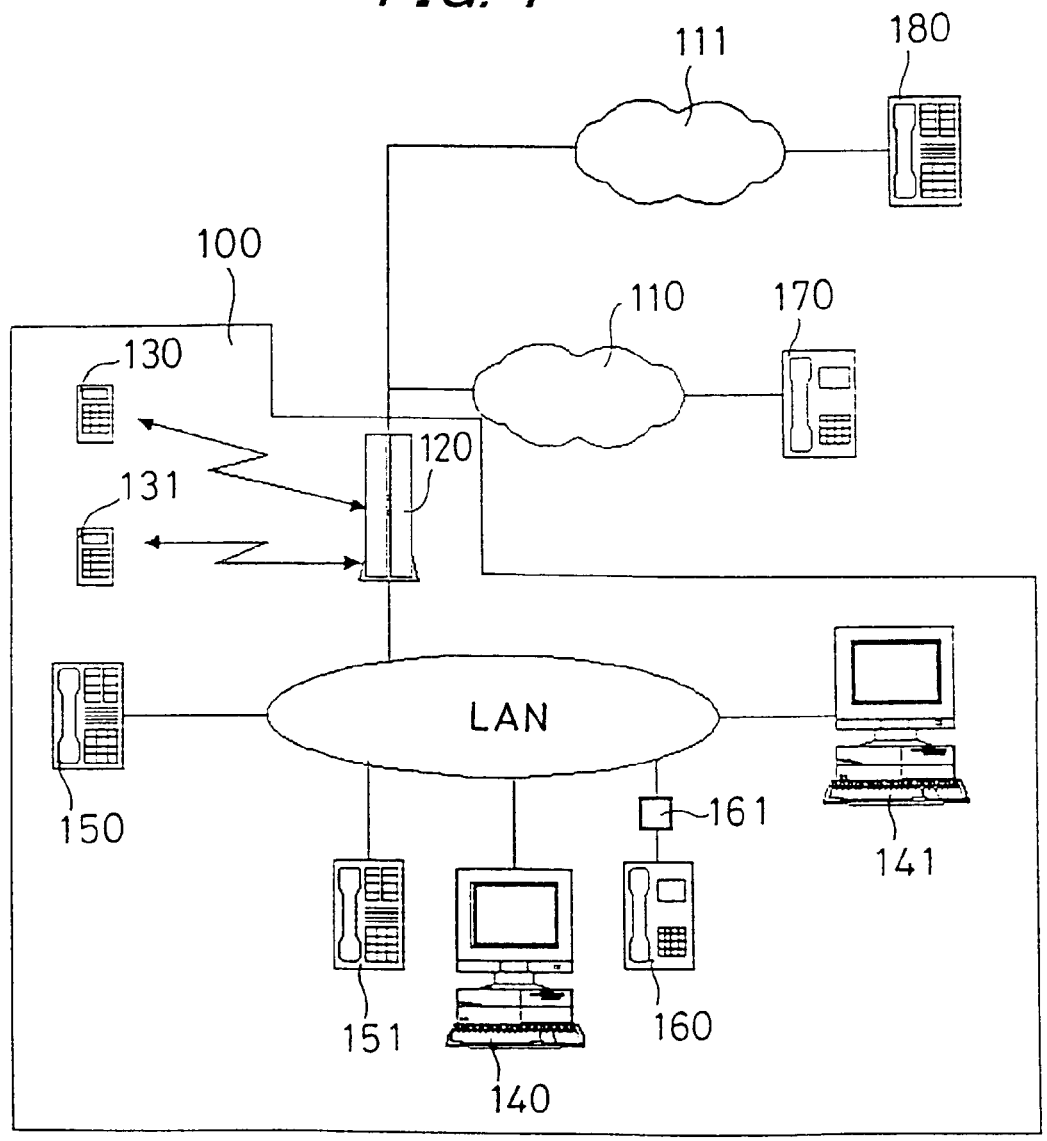
FIG. 1 is a view showing the configuration of a communication system according to one embodiment of the invention.

Now referring to the drawings, preferred embodiments of the invention are described below.

FIG. 1 is a view showing the configuration of a communication system 100 according to one embodiment of the invention. The communication system 100 comprises a gateway 120 as a communication control apparatus, PDA (Personal Digital Assistant) terminals 130 and 131 and personal computers (PCs) 140 and 141 as information terminals, and NET telephone terminals 150 and 151 and an ordinary telephone terminal 160 as telephone terminals.

The apparatus and the terminals in the communication system 100 are interconnected by Ethernet cable or the like to form a LAN (Local Area Network) and can perform IP packet communications with an external network via the gateway 120. In FIG. 1, the LAN is constructed using a ring topology, but the LAN may be constructed using a bus topology or a star topology.

The gateway 120 provides connections to external networks, that is, a public telephone network 110, a digital public telephone network 111, and the Internet (not shown), and controls the telephone communications that the NET telephone terminals 150 and 151 and the ordinary telephone terminal 160 in the communication system 100 perform with an ordinary telephone terminal 170 at the remote end of the public telephone network 110 or a NET telephone terminal 180 at the remote end of the digital public telephone network 111. When the NET telephone terminal 150 or 151 performs telephone communications with the ordinary telephone 170, the gateway 120 performs protocol conversion between an analog voice signal received from or to be transmitted to the ordinary telephone terminal 170 and digital voice data packets received from or to be transmitted to the NET telephone terminal 150 or 151. The digital public telephone network 111 is, for example, a VoIP (Voice over Internet Protocol) network or VoDSL (Voice over Digital Subscriber Line) network or the like.

The gateway 120 also stores therein association information for associating each PDA terminal with a corresponding telephone terminal. In response to a call initiation operation performed at the PDA terminal 130 or 131, the gateway 120 searches for the corresponding NET telephone terminal 150 or 151 based on the IP address of the PDA terminal 130 or 131, and performs processing for the initiation of the call.

The PDA terminals 130 and 131 are each equipped with a telephone directory application program, and store the telephone number or IP address or the like of the NET telephone terminal 180 as destination party identification information for identifying the NET telephone terminal 180 as the destination telephone terminal. When a user activates the telephone directory application program and selects the destination telephone number, the selected telephone number is transmitted to the gateway 120. The gateway 120 then initiates a call to the received telephone number.

The PDA terminals 130 and 131 also store identification information, such as telephone number or IP address, for identifying the NET telephone terminals 150 and 151 obtained from the gateway 120, and when the user selects, for example, the IP address of the NET telephone 150 by using the telephone directory application program, the selected IP address is transmitted to the gateway 120. The gateway 120 then initiates a call and establishes a telephone communication link between the NET telephone 150 and the destination telephone terminal.

The PDA terminals 130 and 131 further store telephone directory information in which the destination telephone number is associated with the name of the subscriber who owns that number, and the telephone directory information is displayed on a display screen when the telephone directory application program is activated. The telephone directory information also carries the type of the telephone number, for example, pilot number, dial-in number and other information such as extension number of the destination party and a group name if the extension is a member of a group of extensions; these pieces of information are displayed together with the telephone number and the name of the destination party. This allows the user to select the telephone number by checking various pieces of information associated with the destination party.

The PCs 140 and 141 are capable of performing packet data communications via the gateway 120 with PCs, servers, etc. connected to the external networks. The PCs 140 and 141 are also equipped with a telephone directory application program similar to the one incorporated in the PDA terminals 130 and 131, and can initiate a telephone call via the gateway 120.

The NET telephone terminals 150 and 151 perform telephone communications with the NET telephone terminal 180, etc. by transmitting and receiving digital voice data packets. The NET telephone terminals 150 and 151 are each implemented using, for example, a VoIP telephone terminal specifically designed for a VoIP network, or a VoDSL telephone terminal specifically designed for a VoDSL network.

The ordinary telephone terminal 160, which cannot process digital data packets by itself, is connected to the LAN via an ordinary telephone terminal connecting adapter 161. The ordinary telephone terminal connecting adapter 161 performs conversion between various signals, such as voice data packets and connect and disconnect signals, received from or to be transmitted to the NET telephone, and analog telephone signals, such as analog voice signals and on-hook and off-hook signals, received from or to be transmitted to the ordinary telephone. Using the ordinary telephone terminal connecting adapter 161, the ordinary telephone terminal 160 can be made to achieve functions equivalent to those of the NET telephone.

The LAN described herein is constructed as a TCP/IP network using Ethernet cable, but other communications lines such as Home PNA (Home Phoneline Networking Alliance) can also be used.

An outline of the call initiation process according to the present embodiment will be described below. The process hereinafter described deals with the case where the user activates the telephone directory application program by operating the PDA terminal 130, searches for the telephone number of the destination telephone terminal, and transmits the result of the search, i.e., the destination telephone number, to the gateway 120 for initiation of the call.

First, the user activates the telephone directory application program on the PDA terminal 130 and, using a search function of the telephone directory application program, searches for the telephone number of the destination telephone terminal 180 to which the user desires to place a call. The PDA terminal 130 transmits the destination telephone number to the gateway 120, together with a request for initiation of a call to that destination telephone number and the IP address of the NET telephone 150 that the user desires to use. The gateway 120 does not initiates the call immediately but waits. When the off-hook condition of the NET telephone 150 is detected by the gateway 120, the gateway 120 makes a call to the received telephone number and establishes a communication link with the NET telephone terminal 180 connected to the digital public telephone network 111. The call initiation process is the same for the case where the destination telephone terminal is the ordinary telephone terminal 170 connected to the public telephone network 110.

Processing of analog voice signals and digital voice data packets, as well as the protocol conversion, is performed in the gateway 120. The processing of analog voice signals and digital voice data packets can be performed not only in the gateway 120, but also in the NET telephone terminals 150 and 151; however, when the processing is performed in the gateway 120, the communication system 100 can accommodate ordinary telephones as well as NET telephones, and ordinary telephones can be connected to the gateway 120 via an analog public line without using the LAN.

FIG. 2 is a block diagram showing the configuration of the PDA terminal 130. The configuration of the PDA terminal 131 is the same as that of the PDA terminal 130. The PDA terminal 130 comprises a CPU (Central Processing Unit) 11, a keypad 12, a display 13, a memory 14, a telephone directory memory 15, and a wireless communication section 16. The keypad 12 includes a connect key used to request the initiation of a telephone call, and serves as destination terminal selecting means and telephone terminal selecting means that the user operates to perform such operations as registering telephone numbers, selecting the telephone number of the destination telephone terminal, and selecting the NET telephone terminal in the communication system 100 that is to be used for telephone communications. The display 13 is realized by an LCD (liquid crystal display) or the like, and serves as telephone directory information displaying means and association information displaying means for displaying telephone directory information, such as the destination telephone number, and identification information for identifying the NET telephone terminals 150 and 151 in the communication system 100. The memory 14 is used to store the basic program for operating the PDA terminal 130, the telephone directory application program, and other information such as the results of operations during the execution of each program. The telephone directory memory 15 serves as telephone directory storing means for storing the telephone directory information such as the destination telephone number. The wireless communication section 16 serves as transmitting means which performs wireless communications with the gateway 120, receives from the gateway 120 the association information showing the associations between the PDA and PC terminals and the NET telephone and ordinary telephone terminals, and transmits to the gateway 120 the user selected destination telephone number and the identification information for identifying the NET telephone terminal 150 or 151 in the communication system 100 that is to be used for telephone communications. The CPU 11 issues operation instructions to the various sections and controls the entire operation of the PDA terminal 130.

FIG. 3 is a block diagram showing the configuration of the gateway 120. The gateway 120 comprises a CPU 21, an analog line I/F (interface) section 22, a digital line I/F section 23, a wireless communication section 24, a LAN I/F section 25, a memory 16, a telephone terminal association memory 27, a display 28, and a voice signal converter 29.

The analog line I/F section 22 interfaces with an analog public line in the public telephone network 110, and performs communications with the ordinary telephone terminal 170 connected to the public telephone network 110. The digital line I/F section 23 interfaces with a digital public line in the digital public telephone network, and performs communications with the NET telephone terminal 180 connected to the digital public telephone network 111. The wireless communication section 24 serves as receiving means which performs wireless communications with the PDA terminal 130 and receives the destination telephone number and the identification information for identifying the NET telephone terminal in the communication system that is to be used for telephone communications. The LAN I/F section 25 is connected to the Ethernet cable, and performs communications with the PCs 140 and 141, the NET telephone terminals 150 and 151, and the ordinary telephone terminal 160 in the communication system 100.

The memory 26 is used to store the basic program for operating the gateway 120 and other information such as the results of operations during the execution of the program. The telephone terminal association memory 27 serves as association information storing means for storing the association information indicating the associations between the PDA and PC terminals and the NET telephone and ordinary telephone terminals in the communication system 100. Telephone terminals that can be operated from the respective PDA terminals for telephone communications are preregistered in the association information. The display 28 visually indicates the control state and communication conditions of the gateway 120. The visual indications may be produced by displaying characters on an LCD or the like or by lighting or flashing LEDs (Light Emitting Diodes) or like devices.

The voice signal converter 29 performs conversion between the analog voice signal, received or to be transmitted during communications over the public telephone network 110, and voice data packets received or to be transmitted via the LAN. The CPU 21 serves as control means which issues operation instructions to the various sections and controls the entire operation of the gateway 120. The CPU 21 also serves as detecting means for detecting whether the NET telephone terminal 150, 151 in the communication system 100 are in an on-hook condition or an off-hook condition.

When the telephone number of the destination telephone terminal is received, the CPU 21 detects whether the NET telephone, for example, the NET telephone 150, associated with the PDA terminal to which the telephone number is transmitted is in an on-hook condition or an off-hook condition. When the off-hook condition is detected, the CPU 21 performs control so as to initiate a telephone call to the destination telephone terminal, for example, the NET telephone terminal 180 and to establish a telephone communication link between the NET telephone 150 and the NET telephone 180.

Figure 4:
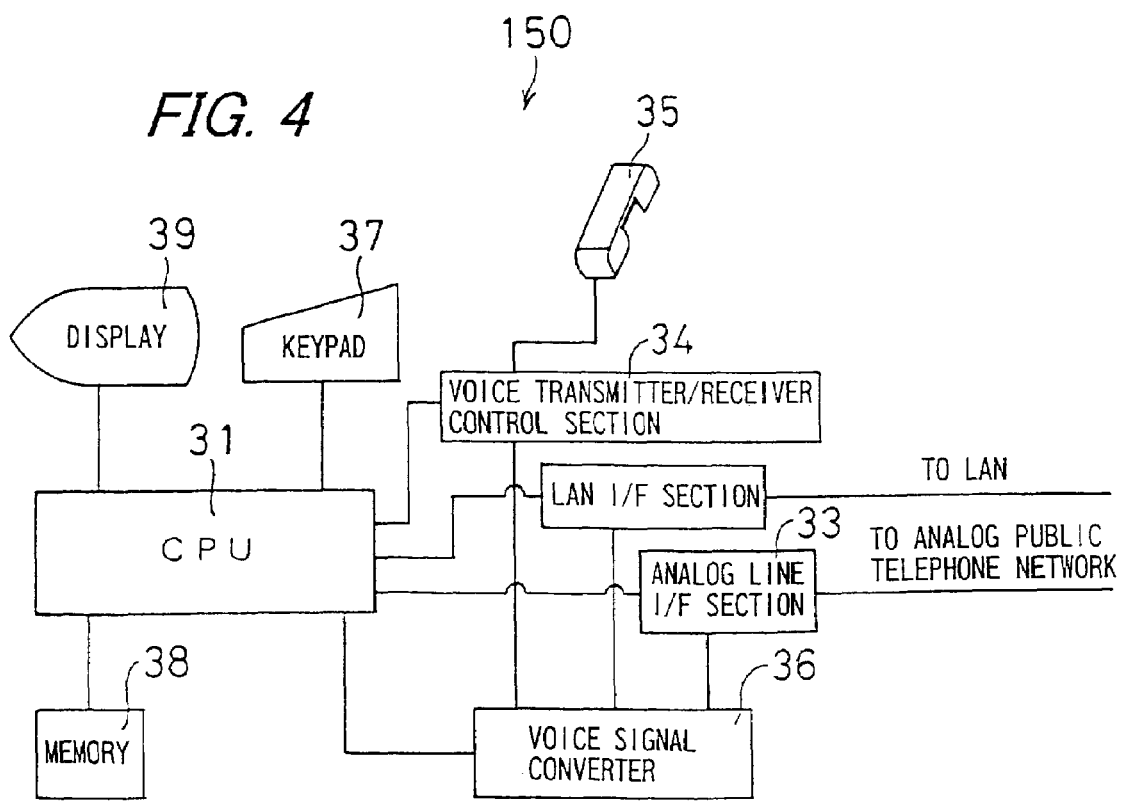
FIG. 4 is a block diagram showing the configuration of a NET telephone terminal.

FIG. 4 is a block diagram showing the configuration of the NET telephone terminal 150. The configuration of the NET telephone terminal 151 is the same as that of the NET telephone terminal 150. The NET telephone terminal 150 comprises a CPU 31, a LAN I/F section 32, an analog line I/F section 33, a voice transmitter/receiver control section 34, a handset 35, a voice signal converter 36, a keypad 37, a memory 38, and a display 39.

The LAN I/F section 32 serves as digital communication means which is connected to the Ethernet cable and performs transmission and reception of voice data packets to and from and transmitted to the gateway 120. The analog line I/F section 33, in the event of a power failure or the like, provides a direct connection to the analog telephone line to enable the NET telephone terminal to perform communications, without the intervention of the gateway 120, with a telephone terminal accommodated in the public telephone network 110. When the LAN is constructed using Home PNA, the I/F section functions as an I/F conforming to the Home PNA standard.

The voice transmitter/receiver control section 34 adjusts the voice volume of the voice signal received from the voice signal converter 36 and outputs the voice to the handset 35, and transfers the voice signal received from the handset 35 on to the voice signal converter 36. The handset 35 contains a speaker and a microphone, wherein the voice signal received from the voice signal converter 36 is output from the speaker, and the voice signal input from the microphone is transferred to the voice signal converter 36. The voice signal converter 36 converts the analog voice signal to digital voice data packets and vice versa.

The keypad 37 is used when the user enters the telephone number of the destination telephone terminal to initiate a call. The memory 38 stores the basic program for operating the NET telephone terminal 150 and other information. The display 39 is realized by an LCD or the like, and displays the called telephone number and communication conditions such as elapsed call time. The CPU 31 issues operation instructions to the various sections and controls the entire operation of the NET telephone terminal 150.

Figure 5:
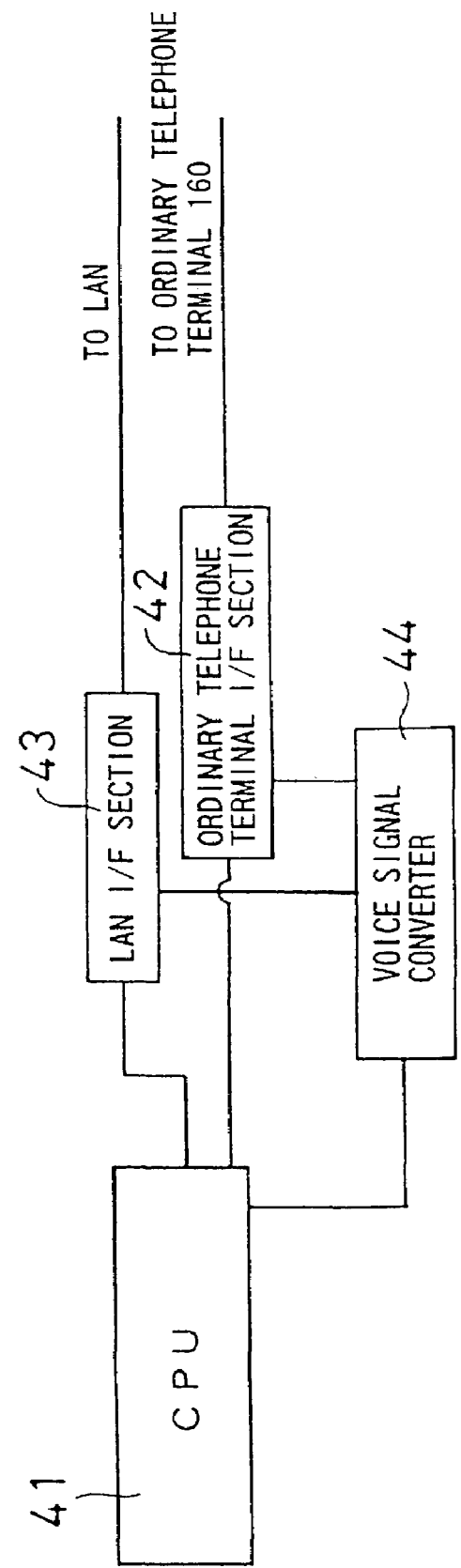
FIG. 5 is a block diagram showing the configuration of an ordinary telephone terminal connecting adapter.

FIG. 5 is a block diagram showing the configuration of the ordinary telephone terminal connecting adapter 161. The ordinary telephone terminal connecting adapter 161 comprises a CPU 41, an ordinary telephone terminal I/F section 42, a LAN I/F section 43, and a voice signal converter 44.

The ordinary telephone terminal I/F section 42 is connected to the analog telephone line and performs transmission and reception of analog voice signals to and from the ordinary telephone terminal 160. The LAN I/F section 43 is connected to the Ethernet cable and performs transmission and reception of voice data packets to and from the gateway 120. The voice signal converter 44 converts the analog voice signal to digital voice data packets and vice versa. The CPU 41 issues operation instructions to the various sections and controls the entire operation of the ordinary telephone terminal connecting adapter 161.

The telephone call initiation process performed in the communication system 100 will be described in detail with reference to the flow charts of FIGS. 6 to 9. The process hereinafter described deals with the case where a telephone call to the ordinary telephone terminal 170 accommodated in the public telephone network 110 is initiated using the PDA terminal 130 and a communication link is established between the NET telephone terminal 150 and the ordinary telephone terminal 170.

Figure 6:
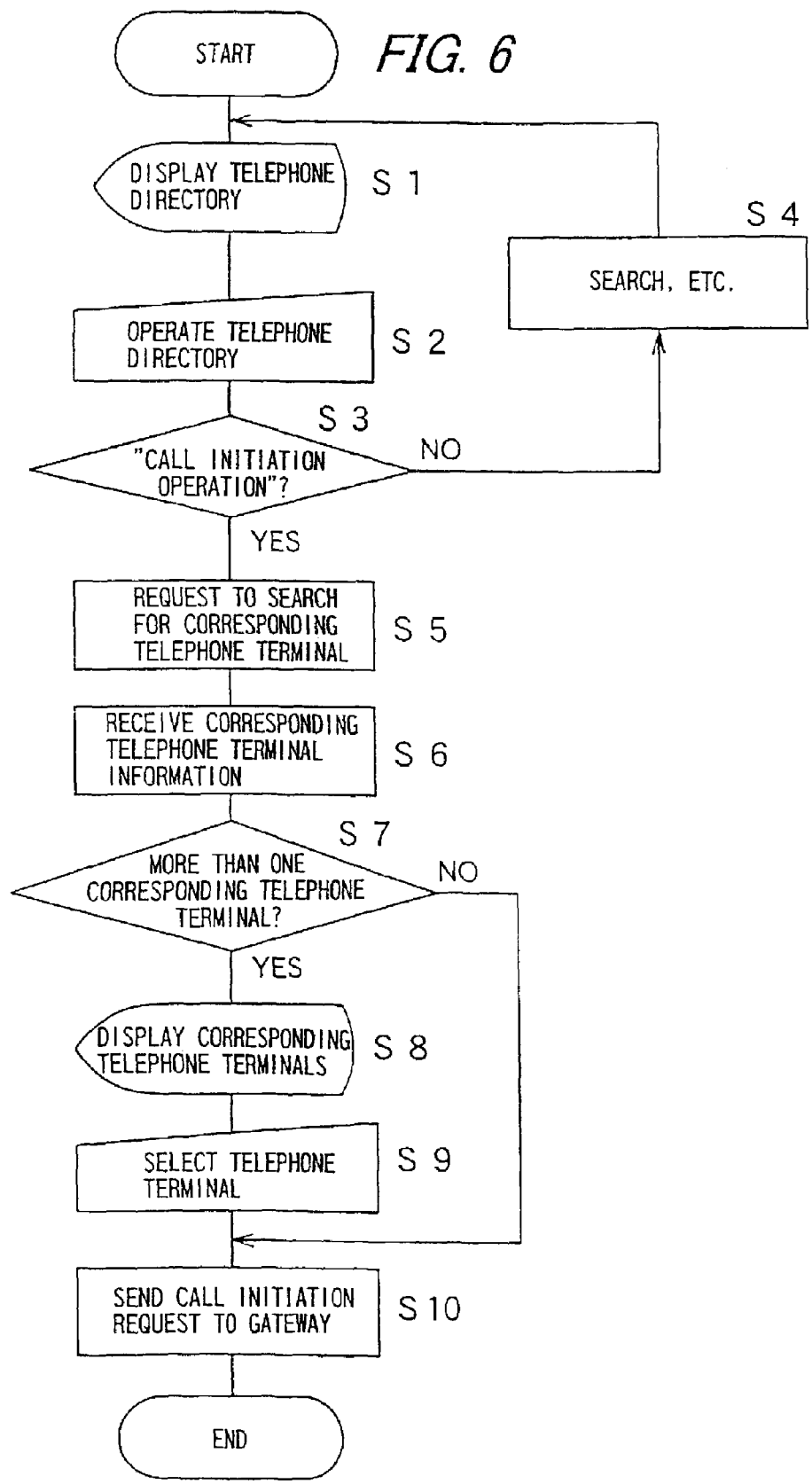
FIG. 6 is a flow chart illustrating a call initiation request process in which the PDA terminal sends a call initiation request to the gateway.
Figure 10C:
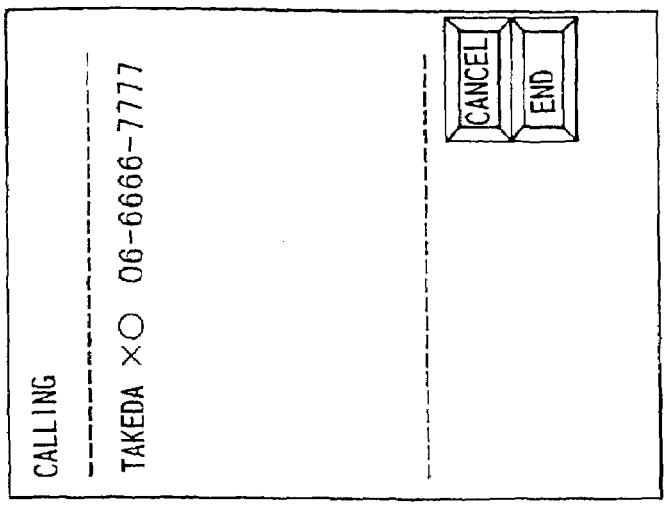
FIGS. 10A to 10C are diagrams showing display examples of the PDA terminal in the call initiation request process.
Figure 10B:
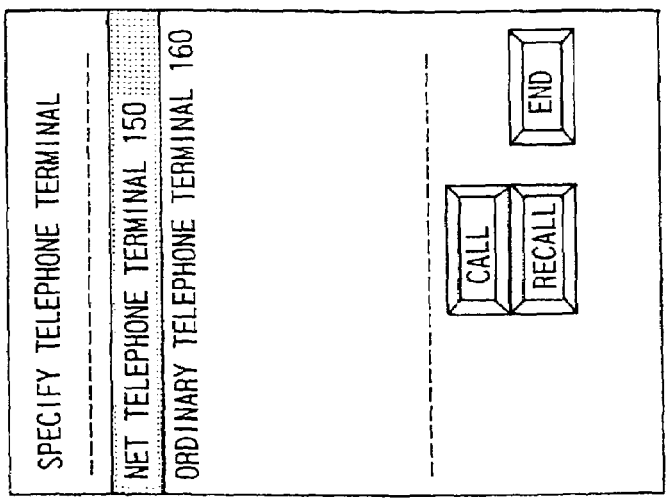
Figure 10A:
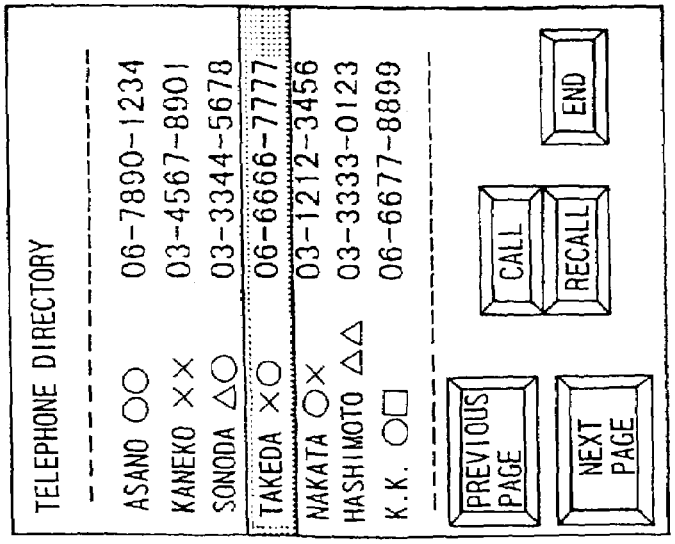

FIG. 6 is a flow chart illustrating a call initiation request process in which the PDA terminal 130 sends a call initiation request to the gateway 120. First, when the user presses the connect key on the keypad 12, the telephone directory application program is activated, and the telephone directory information is displayed on the display 13 at step S1 (see the display example of FIG. 10A). At step S2, the user, while viewing the telephone directory information, performs an operation to activate a desired function of the telephone directory application program. At step S3, it is checked whether a call initiation operation, such as the selection of the telephone number of the destination ordinary telephone terminal 170, for example, has been performed. If such an operation is detected, the process proceeds to step S5; on the other hand, if such an operation is not detected but some other operation is detected, the process proceeds to step S4. At step S4, a search for a telephone number, for example, is performed in response to that other operation, and the process returns to step S1. At step S5, a request to search for the corresponding NET telephone terminal in the communication system 100 is sent to the gateway 120.

Figure 7:
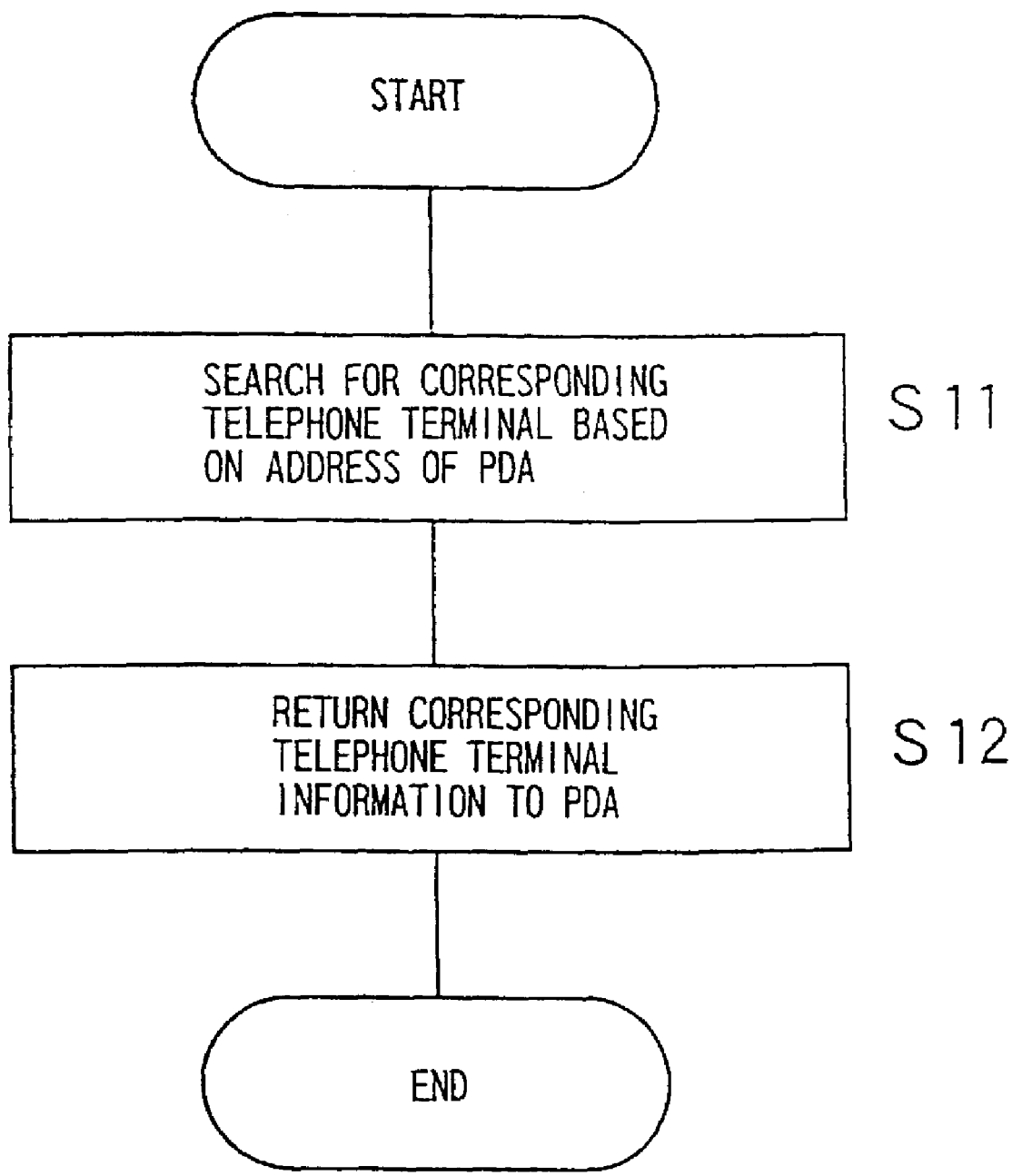
FIG. 7 is a flow chart illustrating a search process in the gateway.

As shown in the search flow chart of FIG. 7, the gateway 120 that received the NET telephone terminal search request from the PDA terminal 130 searches at step S11 through the telephone terminal association memory 27 for the corresponding NET telephone terminal associated with the PDA terminal 130 and, at step S12, sends the IP address of the corresponding NET telephone terminal to the PDA terminal 130.

At step S6, the PDA terminal 130 receives the IP address from the gateway 120. At step S7, it is determined whether there is more than one corresponding NET telephone terminal, and if there is more than one, the process proceeds to step S8; if there is only one, the process proceeds to step S10.

At step S8, the IP addresses of the plurality of corresponding NET telephone terminals are displayed. At step S9, the user selects one NET telephone terminal 150 to be used from among the plurality of NET telephone terminals and enters it from the keypad 12 (see the display example of FIG. 10B). At step S10, the telephone number of the ordinary telephone terminal 170 selected at step S2 and the IP address of the NET telephone terminal 150 are transmitted to the gateway 120 together with a call initiation request command. A screen indicating "CALLING" is displayed on the display 13 (see the display example of FIG. 10C).

Here, a cancel key may be preset on the keypad 12 so that the call, once initiated, can be canceled by pressing the cancel key before the call is connected. When the call is canceled, the process returns to the same state as the state immediately before the call initiation operation is performed, and from this state, the user can redo the call initiation.

Figure 8:
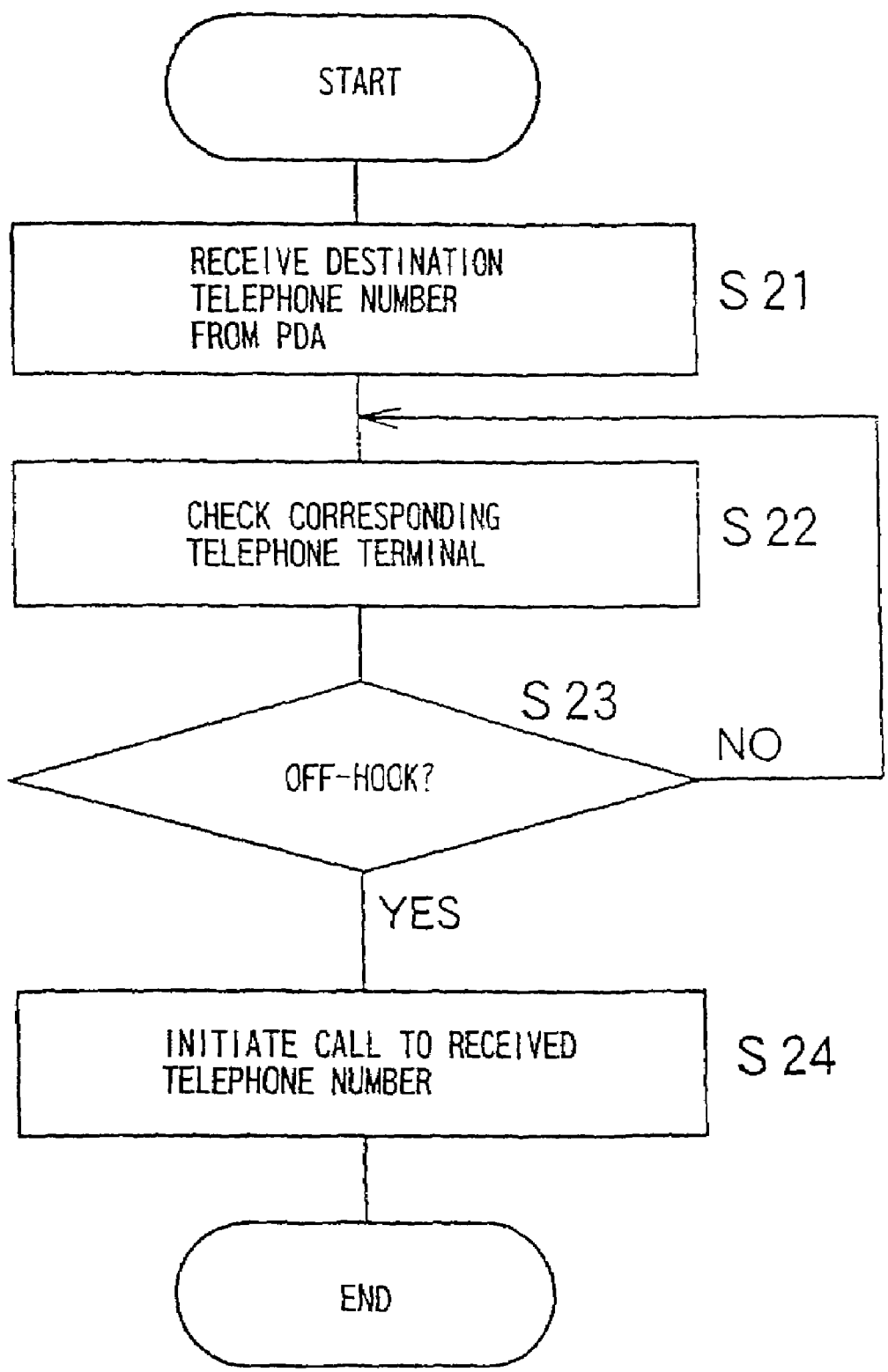
FIG. 8 is a flow chart illustrating a communication link establishing process in the gateway.

FIG. 8 is a flow chart illustrating the communication link establishing process performed by the gateway 120. At step S21, the telephone number of the ordinary telephone terminal 170, the IP address of the NET telephone terminal 150, and the call initiation request command, transmitted from the PDA terminal 130 at step S10 in FIG. 6, are received, and at step S22, the on-hook/off-hook condition of the NET telephone terminal 150 is detected. At step S23, it is determined whether the detected condition is the off-hook condition, and if it is the off-hook condition, the process proceeds to step S24; otherwise, the process returns to step S22. At step S24, a call to the ordinary telephone terminal 170 is initiated to establish a communication link.

Figure 9:
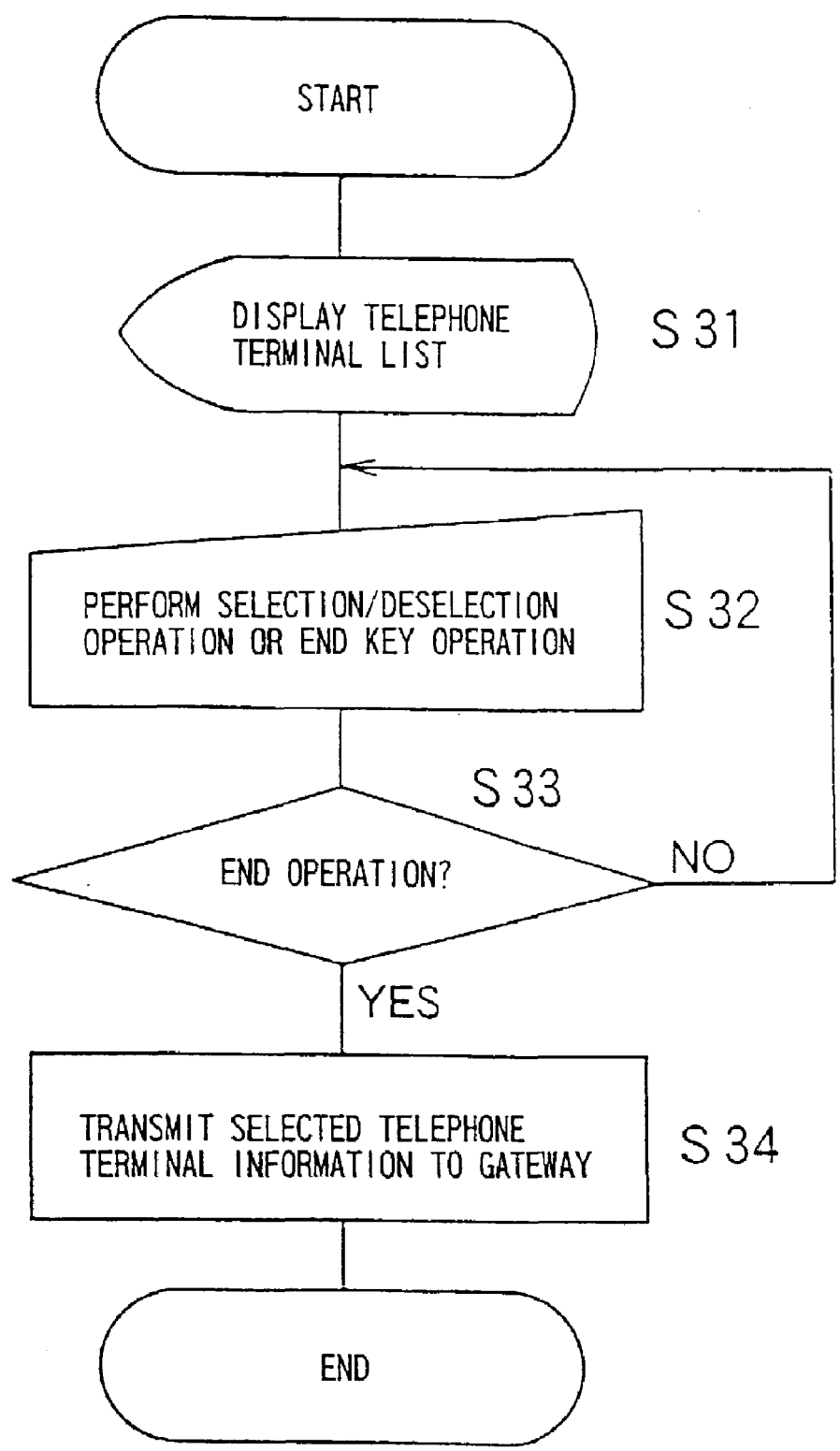
FIG. 9 is a flow chart illustrating the process for registering a PDA terminal/NET telephone terminal association.
Figure 11:
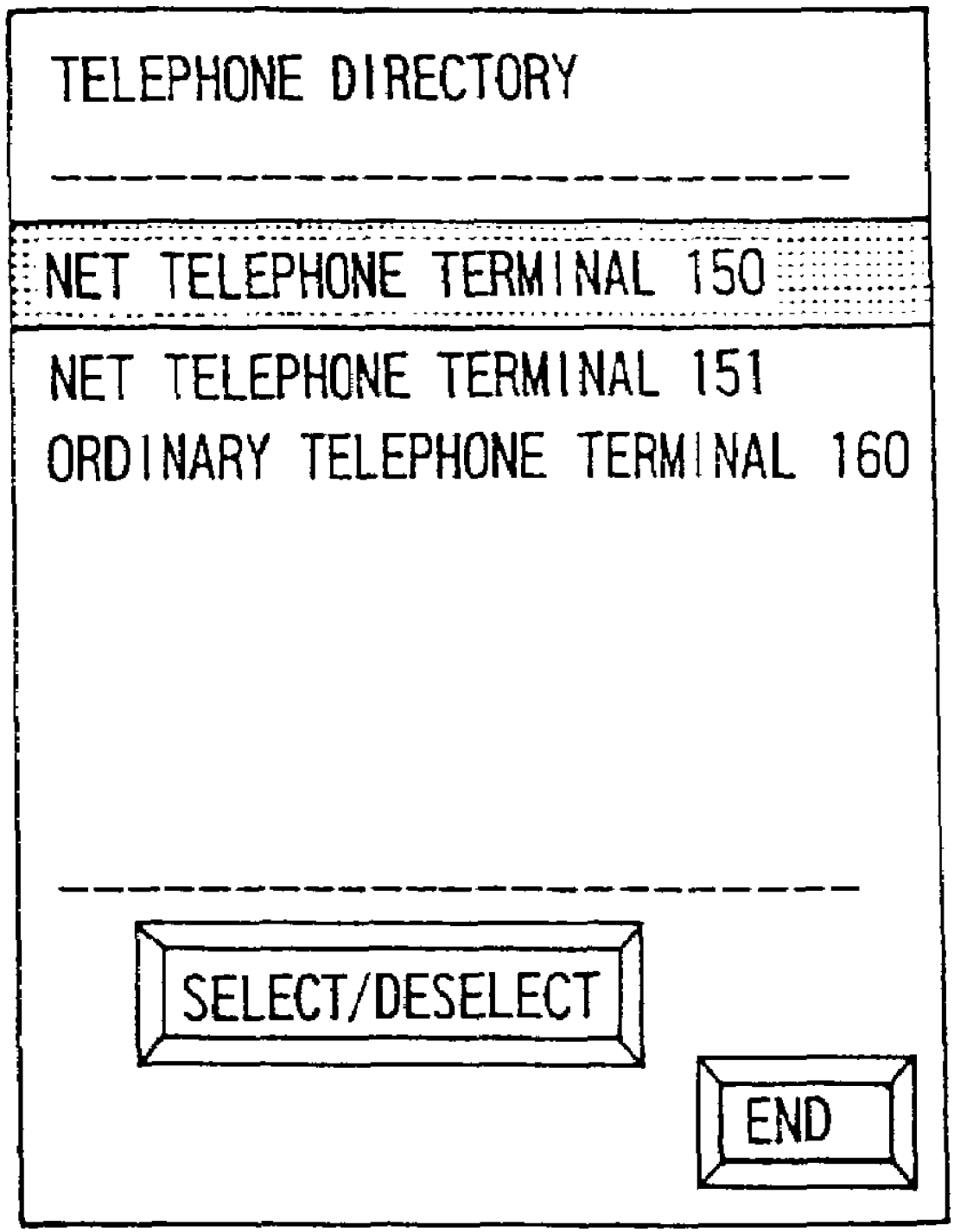
FIG. 11 is a diagram showing display examples of the PDA terminal in the association registration process.

FIG. 9 is a flow chart illustrating the process for registering a PDA terminal/NET telephone terminal association. The association between each PDA terminal 130 and 131 and a NET telephone terminal can be established by operating the PDA terminal 130 and 131. First, a registration program is activated by performing a predetermined operation. When the registration program is activated, the IP addresses of the NET telephone terminals in the communication system 100 are acquired from the gateway 120, and a list of the NET telephone terminals in the communication system 100 is displayed at step S31 on the display 13 (see the display example of FIG. 11). At step S32, the user performs a registration operation to select from the displayed list a NET telephone terminal to be registered, a deselect operation to deselect a previously registered NET telephone terminal, or an end operation to end the registration. At step S33, it is determined whether the end operation is performed; if the end operation is detected, the process proceeds to step S34, otherwise the process returns to step S32. At step S34, the registration/deselection information is transmitted to the gateway 120, whereupon the registration program is terminated. Based on the registration/deselection information, the gateway 120 stores the PDA terminal/NET telephone terminal association in the telephone terminal association memory 27.

FIG. 12 is a table showing the contents stored in the telephone terminal association memory 27. As shown, the PDA terminal 130 is associated with two telephone terminals, the NET telephone terminal 150 and the ordinary telephone terminal 160. In this setting, either the NET telephone terminal 150 or the ordinary telephone terminal 160 can be selected for use by operating the PDA terminal 130. Further, for the NET telephone terminal 150, four information terminals, i.e., the PDA terminals 130 and 131 and the PCs 140 and 141, are registered. In this setting, the NET telephone terminal 150 can be used by operating any one of the four information terminals.

As described above, according to the present embodiment, since the destination telephone terminal is selected by operating the PDA terminal 130 and a call is made to the destination telephone terminal from the gateway 120, the user, when making a call, need only operate the PDA terminal 130, and there is no need to transfer the destination telephone number to the NET telephone terminal. Therefore, the telephone call using the NET telephone terminal as a VoIP telephone terminal can be quickly initiated by a simple operation.

Further, by configuring the system so that the PDA terminal 130 and the gateway 120 can communicate with each other via a wireless link, the connection between the PDA terminal 130 and the gateway 120 can be easily and quickly established. Furthermore, since the telephone directory application program incorporated in the PDA terminal 130 is also used as an ordinary telephone directory for other purposes than making calls, the operation can be standardized, making it easy to operate the program, and the number of programs to be stored in the PDA terminal 130 can also be reduced. Moreover, since the gateway 120 does not actually initiate a call until the NET telephone terminal in the communication system 100 is put in an off-hook condition, a situation can be avoided where the user of the destination telephone terminal side is kept waiting.

Next, another embodiment of the invention will be described. This embodiment differs from the foregoing embodiment in the operation of the CPU 21 of the gateway 120 and the communication link establishing process associated with it. The configuration of the communication system 100, the block diagrams for the gateway 120, the PDA terminal 130, the NET telephone terminal 150, and the ordinary telephone terminal connecting adapter 161, and the flow charts for the call initiation request process performed by the PDA terminal 130 when sending a call initiation request to the gateway 120, the search process performed by the gateway 120, and the PDA terminal/NET telephone terminal association registering process are the same as those in the foregoing embodiment, and the descriptions thereof will not be repeated here.

In the embodiment, the CPU 21 of the gateway 120 also serves as ringing means for sending a ringing signal to the NET telephone terminals 150 and 151.

Figure 13:
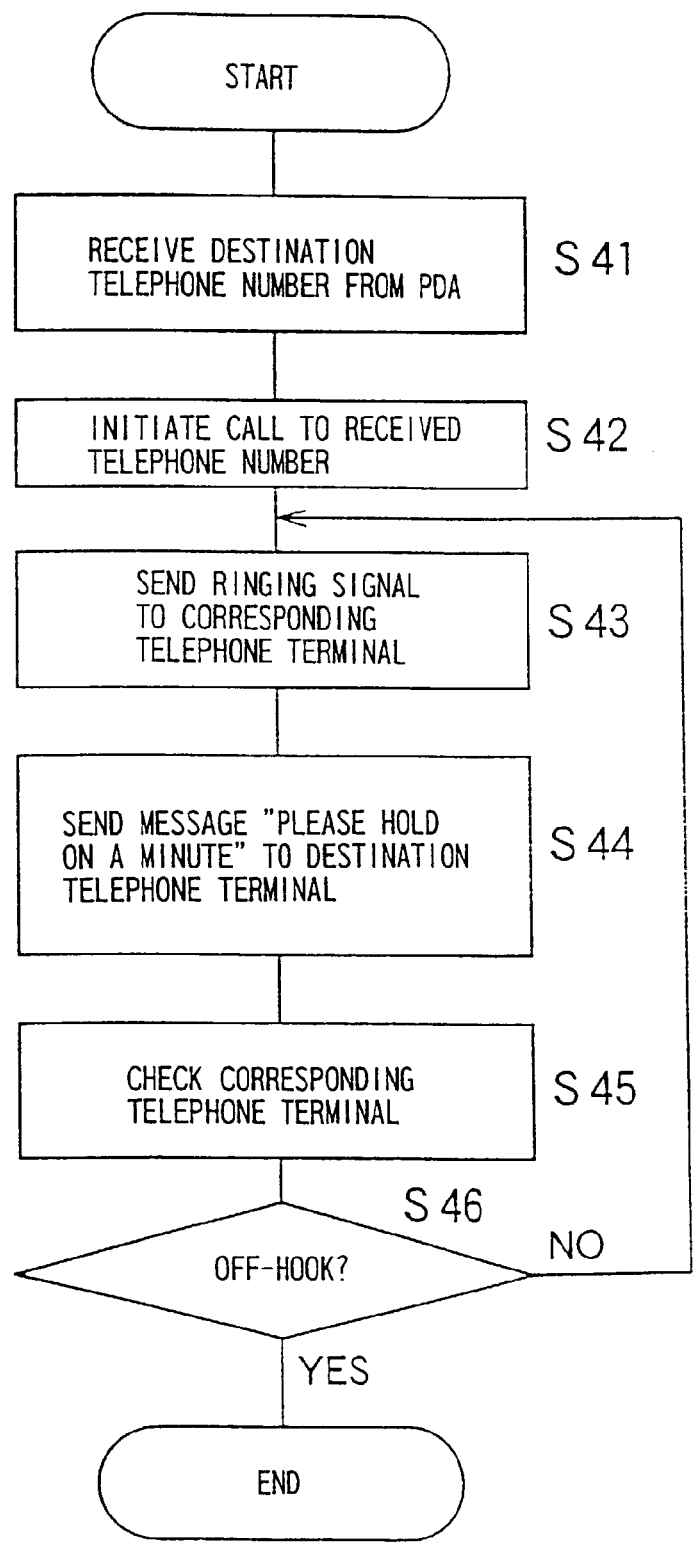
FIG. 13 is a flow chart illustrating a communication link establishing process in the gateway.

FIG. 13 is a flow chart illustrating the communication link establishing process performed by the gateway 120. First, at step S41, the telephone number of the ordinary telephone terminal 170, the IP address of the NET telephone terminal 150, and the call initiation request command, transmitted from the PDA terminal 130, are received by the gateway 120, and at step S42, a call is initiated to the ordinary telephone terminal 170. At step S43, a ringing tone is sent to the NET telephone terminal 150 by the gateway 120. At step S44, the gateway 120 transmits a message saying, for example, "Please hold on a minute", asking the called party to wait, by a voice signal to the ordinary telephone terminal 170. At step S45, the on-hook/off-hook condition of the NET telephone terminal 150 is detected by the gateway 120. At step S46, it is determined by the gateway 120 whether or not the detected condition is the off-hook condition, and if the detected condition is the off-hook condition, the communication link is established; otherwise, the process returns to step S43.

As described above, according to the present embodiment, since the destination telephone terminal is selected by operating the PDA terminal 130 and a call is made to the destination telephone terminal from the gateway 120, the user, when making a call, need only operate the PDA terminal 130, and there is no need to transfer the destination telephone number to the NET telephone terminal; in this way, the telephone call using the NET telephone terminal as a VoIP telephone terminal can be quickly initiated by a simple operation.

Further, by configuring the system so that the PDA terminal 130 and the gateway 120 can communicate with each other via a wireless link, the connection between the PDA terminal 130 and the gateway 120 can be easily and quickly established. Furthermore, since the telephone directory application program incorporated in the PDA terminal 130 is also used as an ordinary telephone directory for other purposes than making calls, the operation can be standardized, making it easy to operate the program, and the number of programs to be stored in the PDA terminal 130 can also be reduced. Moreover, since the gateway 120 immediately initiates a call to the destination telephone terminal upon receiving the destination telephone number, the communication link can be established quickly.

While the above embodiments have been described by taking the public telephone network 110 and the digital public telephone network 111 as examples of the external public network, it will be appreciated that similar effects can also be obtained when the embodiments are applied to the case of a closed telephone network (for example, a leased line network within a private corporation).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication system comprising:
   a communication control apparatus, connected to an external network, for controlling communications with the external network;
   one or more telephone terminals for performing telephone communications, via the communication control apparatus, with a destination telephone terminal accommodated in the external network; and
   one or more information terminals for performing communications with the communication control apparatus,
   wherein the information terminal includes:
   identification information storing means for storing destination terminal identification information for identifying the destination information terminal; and
   transmitting means for transmitting the destination terminal identification information to the communication control apparatus, and
   wherein the communication control apparatus includes:
   association information storing means for storing association information for associating the information terminal with the telephone terminal;
   receiving means for receiving the destination terminal identification information from the information terminal; and
   control means for performing control so as to initiate a call to the destination telephone terminal based on the received destination terminal identification information and so as to establish a telephone communication link between the telephone terminal associated with the information terminal to which the destination terminal identification information is transmitted and the destination telephone terminal.

2. The communication system of claim 1, wherein the communication control apparatus further includes detecting means for detecting whether the telephone terminal is in an on-hook condition or an off-hook condition, and
   wherein when the off-hook condition of the associated telephone terminal is detected by the detecting means, the control means initiates a call to the destination telephone terminal based on the received destination terminal identification information.

3. The communication system of claim 1, wherein the communication control apparatus further includes ringing means for sending a ringing signal to the telephone terminal, and
   wherein the control means initiates a call to the destination telephone terminal based on the received destination terminal identification information, while at the same time, operating the ringing means so as to send the ringing signal to the associated telephone terminal.

4. The communication system of claim 1, wherein the destination terminal identification information is a telephone number uniquely assigned to the destination telephone terminal, and
   wherein the information terminal further includes:
   telephone directory storing means for storing telephone directory information in which the telephone number is associated with a subscriber who owns the destination telephone terminal;
   telephone directory information displaying means for displaying the telephone directory information; and
   destination terminal selecting means for allowing a user to select the telephone number by referring to the displayed telephone directory information,
   wherein the transmitting means transmits the selected telephone number.

5. The communication system of claim 1, wherein the receiving means in the communication control apparatus transmits the association information to the information terminal,
   wherein the transmitting means in the information terminal receives the association information from the communication control apparatus,
   wherein the information terminal includes:
   association information displaying means for displaying the received association information; and telephone terminal selecting means for allowing a user to select the telephone terminal by referring to the received association information, and wherein the transmitting means transmits identification information for identifying the selected telephone terminal.

6. The communication system of claim 1, wherein the external network is a digital public telephone network, and wherein the communication control apparatus includes converting means for performing communication protocol conversion between the telephone terminal and the destination telephone terminal accommodated in the digital public telephone network.

7. The communication system of claim 1, wherein the association information storing means stores one or more pieces of association information.

8. The communication system of claim 1, wherein the association information storing means stores the information by associating each information terminal with one or more telephone terminals.

9. The communication system of claim 1, wherein the telephone terminal includes digital communication means for performing telephone communications with the destination telephone terminal by using digital signals.

* * * * *